United States Patent [19]

McCluskey et al.

[11] Patent Number: 5,473,937
[45] Date of Patent: Dec. 12, 1995

[54] TEMPERATURE SENSING APPARATUS

[75] Inventors: Claudine M. McCluskey, Bridgewater; Alan M. Sadler, North Attleboro, both of Mass.; John J. Chrupcala, Warren, R.I.

[73] Assignee: Texas Instruments Incorporated, Dallas, Tex.

[21] Appl. No.: 62,644

[22] Filed: May 14, 1993

[51] Int. Cl.[6] .............................. G01K 1/08; G01K 1/14
[52] U.S. Cl. ................................... 73/118.1; 374/143
[58] Field of Search .................... 73/118.1, 162; 374/141, 142, 143

[56] References Cited

U.S. PATENT DOCUMENTS

| 4,136,329 | 1/1979 | Trobert | 340/459 |
|---|---|---|---|
| 4,262,335 | 4/1981 | Ahlen et al. | 364/431 |
| 4,562,729 | 1/1986 | Maloney | 73/118.1 |
| 4,659,235 | 4/1987 | Gilmore, Jr. et al. | 73/714 |
| 4,735,511 | 4/1988 | Gauer et al. | 374/141 |
| 4,779,577 | 10/1988 | Ritter et al. | 123/41.05 |
| 4,853,503 | 8/1989 | Sanford . | |
| 4,861,953 | 8/1989 | Sanford . | |
| 4,890,088 | 12/1989 | Woodell | 340/459 |
| 4,987,783 | 1/1991 | D'Antonio et al. | 73/432.1 |
| 5,004,876 | 4/1991 | Sogge et al. . | |
| 5,015,808 | 5/1991 | Czarn et al. . | |
| 5,097,841 | 3/1992 | Moriuchi et al. | 73/708 |
| 5,101,549 | 4/1992 | Sogge et al. . | |
| 5,107,246 | 4/1992 | Mogaki | 73/118.1 |
| 5,129,259 | 7/1992 | View et al. | 73/118.1 |

Primary Examiner—Richard E. Chilcot, Jr.
Assistant Examiner—Eric S. McCall
Attorney, Agent, or Firm—Russell E. Baumann; Richard L. Donaldson; René E. Grossman

[57] ABSTRACT

A sensor assembly for use with automotive transmission systems includes an overmolded lead frame 10 having a plurality of sensing stations 16, 17 18, 19 20, 21 and 22. A temperature dependent resistor 32 is encapsulated in a post 42 integrally formed with the overmold at temperature sensor station 16. Post 42 is adapted to be received in a bore 68 cast in the transmission housing wall and serves as a datum to position the mounting holes of the assembly in alignment with selected bores in the transmission housing. Temperature sensing station 16 is circumscribed by an annular rib 52 which cooperates with a plurality of protrusions 62 to receive therebetween an O-ring seal member 54.

11 Claims, 4 Drawing Sheets 5,473,937

TEMPERATURE SENSING APPARATUS

BACKGROUND OF THE INVENTION

This invention relates generally to temperature sensing and more particularly to temperature sensing of hydraulic fluid used in vehicular transmission systems.

In recent years, it has become conventional in the motor vehicle art to control various functions by means of microprocessor based controls to obtain performance improvements. For example, in automatic transmissions solenoid valves are used to effect gear shifting and valve actuation is sensed by placing pressure switches in communication with hydraulic lines so that a change in pressure in such lines which occurs upon valve actuation and de-actuation can be sensed with a suitable electrical signal provided to the microprocessor as a result of the switching. Switch assemblies of this type are shown for example in U.S. Pat. Nos. 4,861,953; 4,853,503; 5,004,876; 5,101,549 and 5,015,808.

Another relevant control input to the microprocessor is the temperature of the hydraulic fluid since the viscosity of the fluid varies with temperature. It is known to drill and tap a bore in the transmission housing in communication with a hydraulic line and to insert a temperature probe mounted on a threaded base into the bore and to connect a suitable electrical lead to the microprocessor. Although this provides the required data in a satisfactory manner it requires separate operational steps to set-up the transmission housing in a drill press, drill and tap the bore as well as handling the separate electrical lead and therefore involves an undesirable cost.

It is an object of the present invention to provide temperature sensing apparatus for use with vehicular transmission systems, particularly with automatic transmission systems, which is less expensive to install than prior art sensors and yet which are reliable and durable.

Other objects, features and advantages of the invention will be apparent from the following detailed disclosure taken in conjunction with the accompanying drawings, wherein like reference numerals refer to like parts.

SUMMARY OF THE INVENTION

Briefly, in accordance with the invention, a sensor assembly for use with automatic transmission systems comprises a lead frame having a connector portion and a plurality of electrically conductive traces emanating from the connector portion to a plurality of sensor stations including at least one pressure sensing station and a temperature sensor station. The temperature sensor station includes a temperature dependent electrical resistor element having leads which are electrically connected to first and second traces with the leads bent approximately 90° so that the resistor element is disposed a selected distance above the traces. According to a feature of the invention, the lead frame, along with the resistor element and leads, are overmolded with electrically insulative material with the resistor element incorporated in a post. An annular rib circumscribes the post and forms a seal seat. According to another feature of the invention, an O-ring member having a flat bottom surface and an upper frusto-conical, outwardly facing surface is received on the seal seat and is captured by deforming the top surface of the annular rib onto the O-ring member. According to another feature of the invention, a plurality of protuberances extend upwardly from the upper face of the overmolded lead frame within the area defined by the annular rib but spaced therefrom a distance selected to receive the O-ring member between the rib and the protuberances to prevent displacement, inward movement, or collapse of the O-ring member. According to yet another feature of the invention, the base of the post is circular with at least the upper portion of the post frusto-conical in configuration with the upper free distal end of the post having a smaller diameter than the base to facilitate use of the base of the post as a datum or reference for the location of the several sensing stations and bracket mounting holes. That is, a shifting of the top of the post within the vertical footprint of the base can be tolerated without adversely affecting the use of the base as a datum.

According to yet another feature of the invention, a plurality of vertically extending flutes are formed in the outer surface of the post to enhance the responsivity of the temperature dependent resistor to changes in temperature of the hydraulic fluid contacting the surface of the post. At the same time the ribs betweens the flutes serve as bumpers to minimize the possibility of abrading through the post wall to the resistor element caused by possible misalignment of the post along with vibration over the life of the vehicle.

DESCRIPTION OF THE PREFERRED EMBODIMENTS

Figure 1:
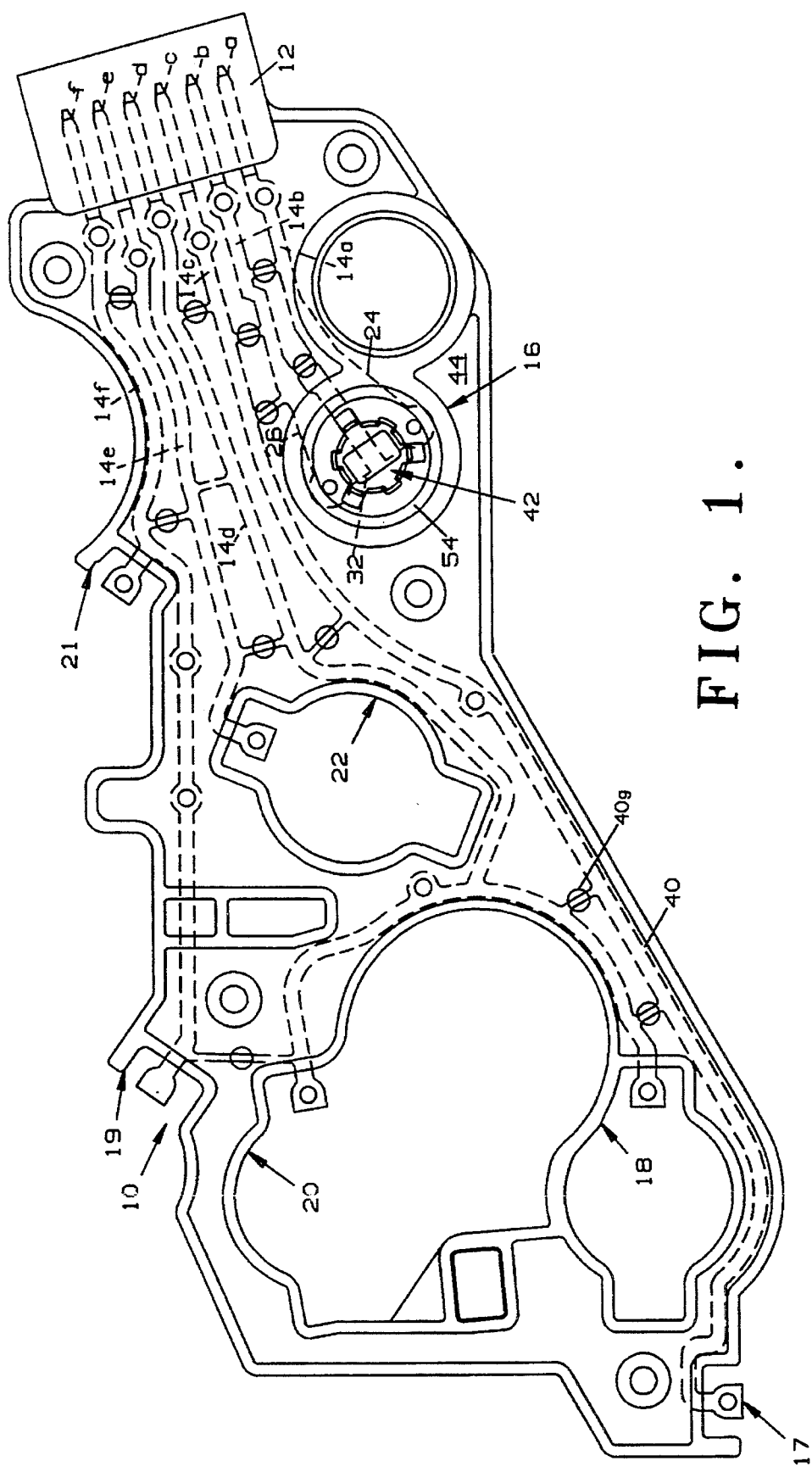
FIG. 1 is a top plan view of an overmolded lead frame made in accordance with the invention.
Figure 7:
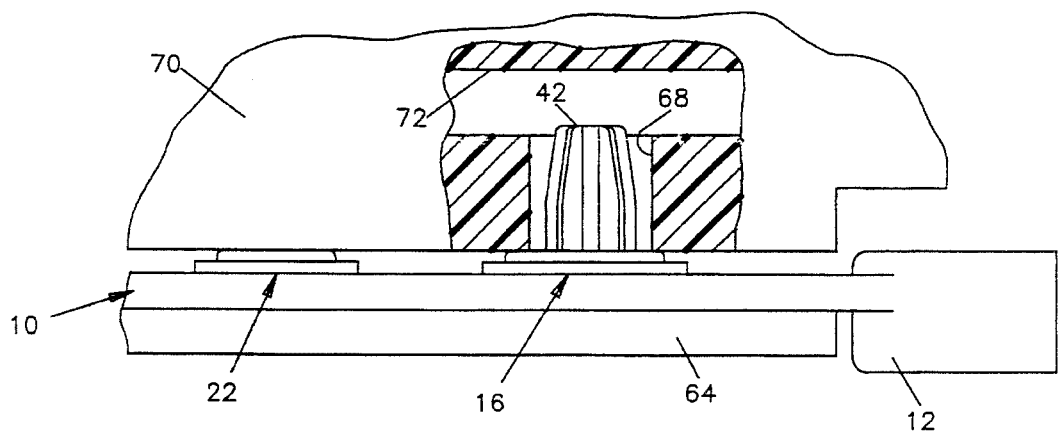
FIG. 7 is a front elevational view of a portion of the lead frame assembly shown mounted against the wall of a valve control body of an automotive transmission shown with a portion of the valve control body in cross section.

With reference to the drawings, FIG. 1 shows a sensor assembly lead frame 10 having a connector portion 12 mounting a plurality of terminal pins a–f integrally attached to conductive traces 14a–14f leading to a plurality of sensor stations including temperature sensing station 16 and pressure sensing stations 17, 18, 19, 20, 21 and 22 respectively. The pressure sensing stations are adapted to receive suitable pressure responsive switches such as those shown for example in U.S. Pat. Nos. 4,853,503 and 5,101,549 referenced supra. The switches, one of which is shown at sensor station 22 in FIG. 7, are not shown in detail but reference may be had to the referenced patents for further details. It will be understood that other pressure responsive switches could be used if desired. Essentially, either normally open or normally closed on/off pressure responsive electrical switches are mounted at the pressure sensing stations and are adapted to be placed in communication with hydraulic fluid lines of a control valve body of an automatic transmission in order to sense the status of selected functions. That is, a pressure level above or below a selected level in a given hydraulic line reflects whether the corresponding function has occurred, e.g., whether the transmission is in the reverse mode of operation.

Figure 2:
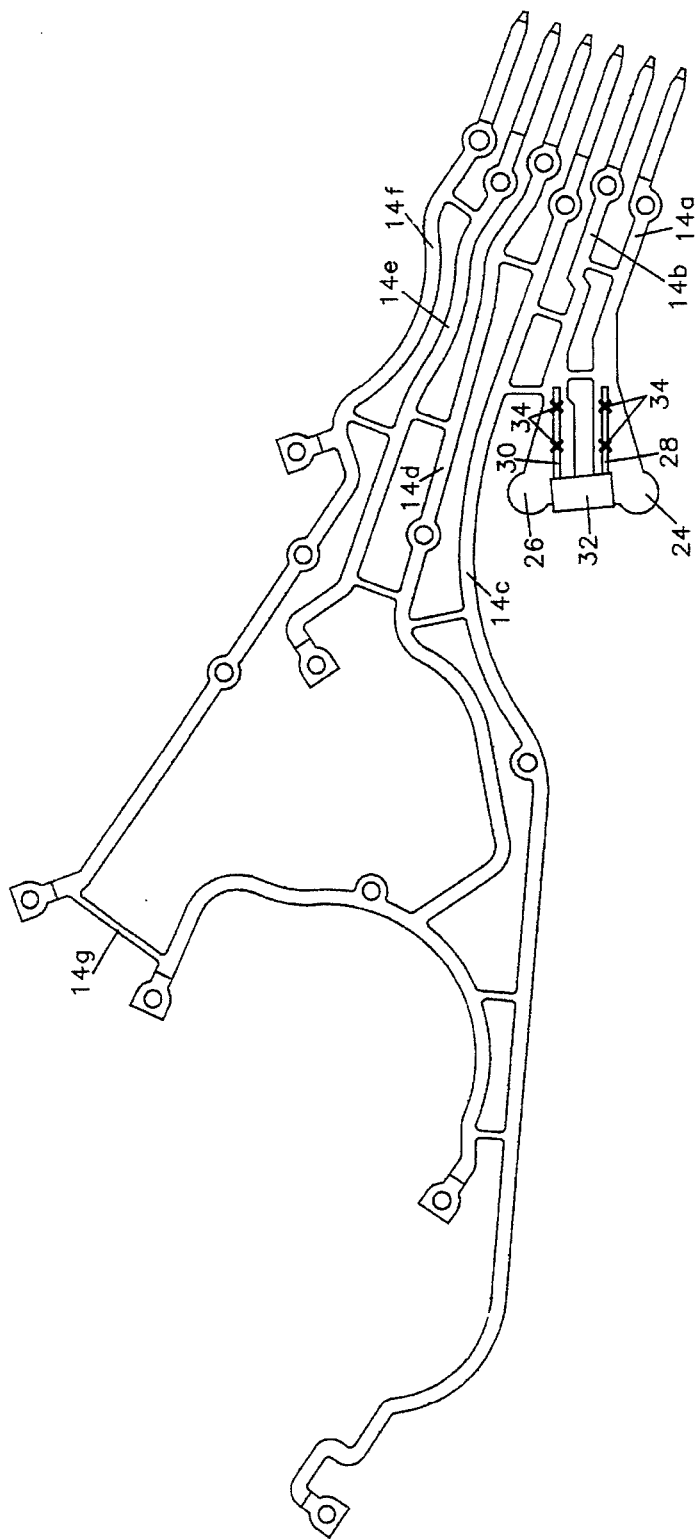
FIG. 2 is a top plan view of the lead frame before being overmolded and with the temperature sensing element attached to traces of the lead frame with the leads of the sensor element bent to dispose the sensing element at a selected distance above the traces.
Figure 3:
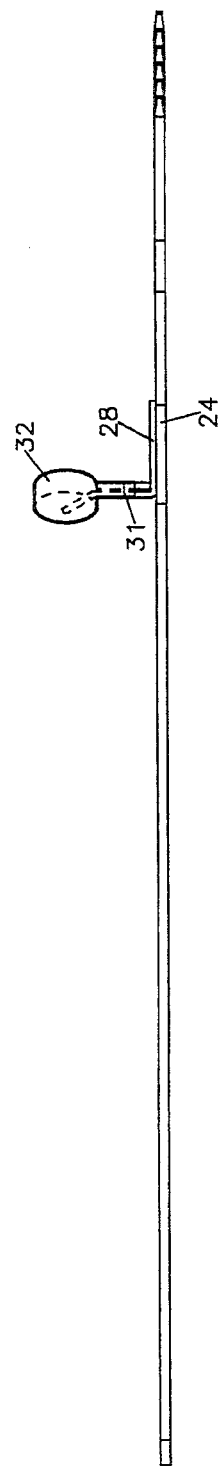
FIG. 3 is a front elevation of the FIG. 2 lead frame.
Figure 3A:
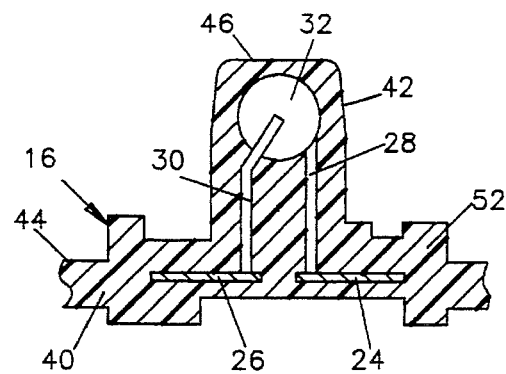
FIG. 3a is a cross sectional view taken through the temperature sensing station of FIG. 1 but before the seal is installed.

Traces 14a and 14b lead to platforms 24, 26 respectively. Electrically conductive leads 28 and 30 have one end electrically attached to spaced portions of a temperature dependent electrical resistor such as disc shaped thermistor 32 as best seen in FIGS. 2 and 3 and have their opposite ends electrically attached to platforms 24, 26 respectively as by welding at 34. Leads 28, 30 are bent upwardly approximately 90° so that thermistor 32 is disposed a selected distance above the platform. Typically, the thermistor and the end portions of leads 28, 30 attached thereto are coated with an epoxy layer 31 extending down to a point above the bend line such as at 31 shown in FIG. 3. After the leads are attached to the lead frame, the lead frame is overmolded with suitable electrically insulative material 40 completely encapsulating thermistor 32 in a post 42 extending upwardly from upper face 44 of lead frame 10 at temperature sensing station 16. Post 42 is generally cylindrical at its base with its upper portion formed in the configuration of a frustum of a cone so that minor shifting of the top 46 in any direction as the material sets following the molding operation can be accommodated without going outside the vertical footprint of the base of the post. The base of the post is preferably used as a datum or reference point to properly locate the mounting holes of the bracket holding the lead frame assembly with the other sensing stations being properly oriented relative to orifices formed in the housing of the control valve body so that if the top of the post shifted over the footprint of the base the mounting holes would be misaligned with their respective bores.

Figure 4:
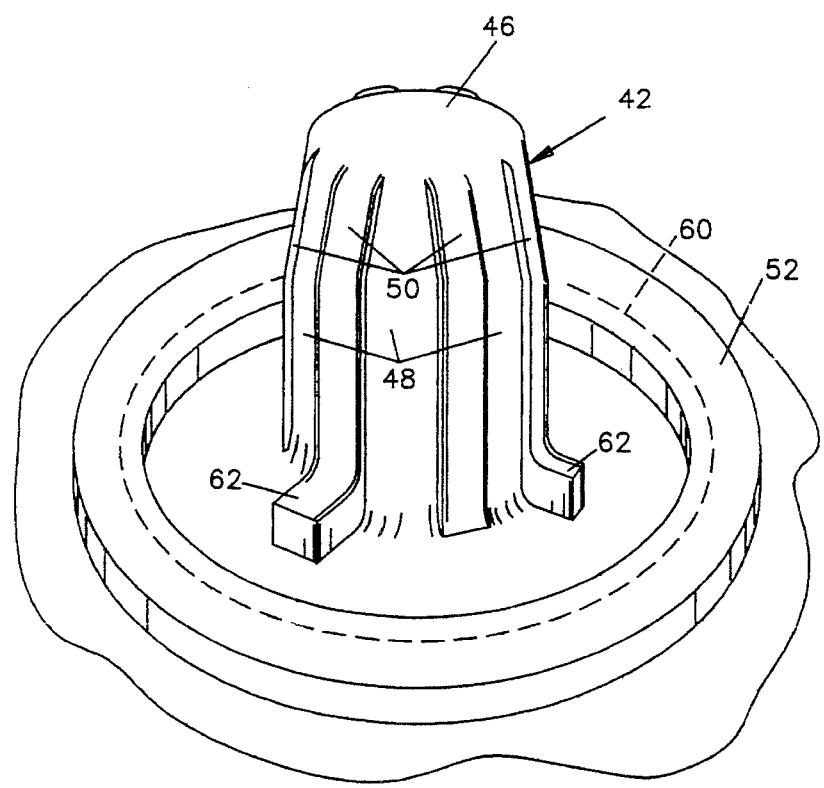
FIG. 4 is an enlarged perspective view of the temperature sensing station of FIG. 1 shown before the seal is installed.
Figure 5:
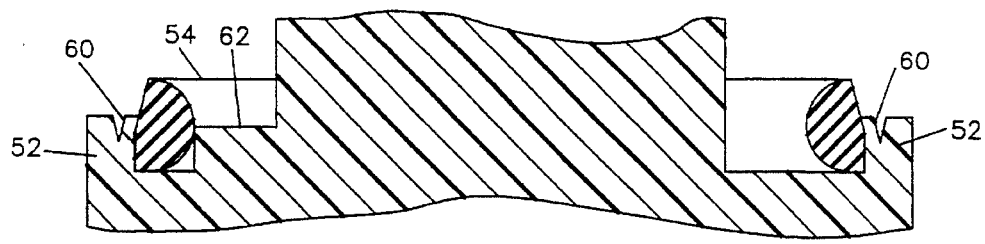
FIG. 5 is a cross sectional view of the seal portion of the temperature sensing station shown with the seal installed.

Post 42 is provided with a plurality of longitudinally extending rounded grooves or flutes 48 (see FIG. 4) to decrease the wall thickness and mass of the electrical insulation between the outside surface and thermistor 32 to enhance the response time of the thermistor relative to changes in temperature of a fluid in contact with the post. At the same time, ribs 50 defining the flutes serve as bumpers to minimize the possibility of the sidewall of the post being abraded by the sidewall of the bore in which the post is disposed due to a combination of vibration during the normal life of the automotive vehicle and a possible slight misalignment of the post where it comes closer to the sidewall of the bore than intended.

Figure 6:
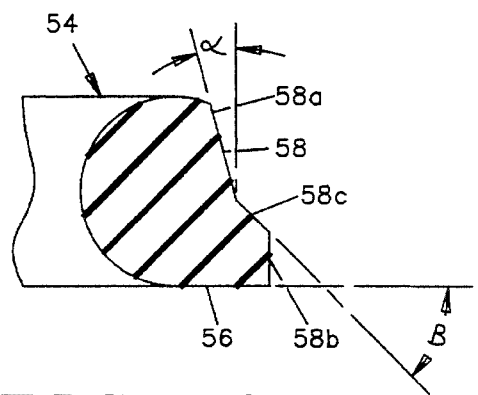
FIG. 6 is an enlarged cross sectional view taken through the seal member.

Temperature sensing station 16 is formed with an annular rib 52 circumscribing post 42 and spaced from the post to accommodate an annular O-ring type seal member 54. Seal member 54 is formed of conventional flexible material such as an ethylene acrylic copolymer having a hardness of 75 durometer, and as seen in FIG. 6, has a bottom flat surface 56 and an outer surface 58 having an upper surface portion 58a which is frusto-conically configured forming an angle α with its longitudinal axis over 0° to approximately 3°. Preferably, a lower surface portion 58b is generally cylindrical in configuration having a size generally conforming to the inside diameter of rib 52. A transitional surface portion 58c which joins the upper and lower surface portions forms an angle β with the horizontal of approximately 30°. Seal member 54 is placed on the seal seat and then the top or upper surface of wall 52 is deformed at 60 forcing the upper, inner portion of the rib into an interference fit or gripping engagement with the upper surface portion 58a of seal member 54. Although the deformation could be effected at spaced locations about the periphery of rib 52 it is preferred to have a continuous circular deformation. A similar sealing system is shown and described in copending application Ser. Nos. (07/913,275 and 07/913,510) assigned to the assignee of the present invention.

A plurality of protrusions 62 are formed within the area circumscribed by rib 52 spaced therefrom a distance selected to accommodate seal member 54 and yet prevent inward movement, displacement or collapse of the seal member 54.

It will be understood that after overmolding lead frame 10 the various runners, such as runner 14g identified in FIG. 2, holding the lead frame traces together prior to the overmolding operation are severed through appropriate apertures in the overmold such as aperture 40g shown in FIG. 1 in order to provide a selected electrical circuit.

As shown in FIG. 7 overmolded lead frame 10 is received on a bracket 64 which is mounted against the transmission housing wall, or more specifically the control valve body 70, using conventional fasteners (not shown) and with post 42 received in a bore 68 in communication with and in heat transfer relation with the hydraulic fluid flowing in passage 72 of the control valve body. The pressure switch at station 22 is similarly in communication with a selected circuit passage of the control valve body.

The assembly made in accordance with the invention provides a significant cost savings over conventional approaches in that mounting the temperature sensor on the same lead frame which mounts pressure responsive electrical switches results in adding the temperature sensing function without having to provide separate connecting wires and/or mounting means.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A sensor assembly for motor vehicle transmission systems comprising a lead frame having a connector portion and a plurality of electrically conductive traces emanating from the connector portion to a plurality of sensor stations including a temperature sensor station, a temperature dependent electrical resistor element, first and second leads having opposite distal ends attached at one end thereof to spaced portions of the resistor element and being welded adjacent their other ends to respective first and second traces at the temperature sensor station, the first and second leads extending approximately 90° away from the first and second traces, the lead frame including the resistor element and first and second leads being overmolded with electrically insulative material, the insulative material having opposed upper and lower faces, a generally annular rib formed of the insulative material on the upper face and a post of the insulative material extending upwardly above the rib from the upper face within the annular rib, the resistor being disposed within the post, an O-ring seal seat formed contiguous with the annular rib, an O-ring disposed on the O-ring seat and extending above the rib and means to mount the overmolded lead frame against a transmission housing with the post received in a bore in a wall of the housing in communication with fluid flowing through the transmission.

2. A sensor assembly according to claim 1 in which the post is formed with a plurality of vertically extending rounded grooves thereby decreasing the wall thickness and mass of the insulative material.

3. A sensor assembly according to claim 1 in which the post has a base and a distal free end and at least a portion of the post is shaped generally as a frustum of a cone with the base being larger than the free distal end.

4. A sensor assembly according to claim 1 in which the O-ring seat is disposed within a space defined by the rib and the rib has a top surface which is deformed into engagement with the O-ring at the O-ring seat.

5. A sensor assembly according to claim 1 in which the O-ring seal is disposed within a space defined by the rib and further including protrusion means extending upwardly from the upper face inboard of the O-ring seat to prevent movement of the O-ring.

6. A sensor assembly according to claim 5 in which the protrusion means comprises a plurality of protrusions spaced around the post.

7. A sensor assembly according to claim 1 in which the O-ring seat is disposed within a space defined by the rib and the O-ring has a generally flat bottom surface and an outer surface extending from the generally flat surface upwardly a selected distance to an upper distal portion above the annual rib, at least an upper portion of the outer surface proximate to the top of the annular rib being frusto-conical in configuration, the top of the rib being deformed into engagement with the said at an upper portion of the outer surface to lock the O-ring at the seat thereof.

8. A sensor assembly according to claim 7 in which the rib is deformed continuously around the periphery of the annular seat.

9. A sensor assembly according to claim 7 in which a lower portion of the outer surface contiguous with the flat bottom surface of the O-ring forms a cylindrical surface which extends upwardly to a point below the top of the annular rib.

10. A sensor assembly for motor vehicle transmissions comprising a lead frame having a connector portion and electrically conductive trace means emanating from the connector portion to a temperature sensor station, a temperature dependent electrical resistor element, first and second leads having opposite distal ends attached at one end thereof to spaced portions of the resistor element and being electrically connected adjacent their other ends to respective first and second traces at the temperature sensor station, the first and second leads extending approximately 90° away from the first and second traces, the lead frame including the resistor element and first and second leads being overmolded with electrically insulative material, the overmolded lead frame having an upper face, the electrically insulative material forming a post extending upwardly above the upper face, the resistor being disposed within the post, an O-ring seal seat formed around the post, an O-ring disposed on the O-ring seat and means to mount the overmolded lead frame against a transmission housing with the post received in a bore in a wall of the housing in communication with fluid flowing through the transmission.

11. A sensor assembly for motor vehicle transmissions comprising a lead frame having a connector portion and electrically conductive trace means emanating from the connector portion to a plurality of sensing stations including at least one pressure sensing station and a temperature sensor station, the at least one pressure sensing station comprising a pressure sensing electric switch, the temperature sensor station comprising a temperature dependent electrical resistor element, the pressure sensing electric switch and the temperature dependent electric resistor element being electrically connected to respective traces, the lead frame being overmolded with an electrically insulative material, the overmolded lead frame having an upper face, means to mount the resistor at a location disposed above the upper face, and means to mount the overmolded lead frame against a transmission housing with the pressure sensing electric switch placed in pressure receiving communication with fluid in an hydraulic control line of a control valve body of the transmission and the resistor received in a bore in a wall of the housing in communication with fluid flowing through the transmission.

\* \* \* \* \*